US012188359B2

(12) United States Patent
Rogers et al.

(10) Patent No.: US 12,188,359 B2
(45) Date of Patent: Jan. 7, 2025

(54) BLADE OUTER AIR SEAL WITH RETAINER RING

(71) Applicant: RTX CORPORATION, Farmington, CT (US)

(72) Inventors: Daniel S. Rogers, Lyman, ME (US); James E. Weisheit, Kennebunk, ME (US); Morely S. Sherman, Portsmouth, NH (US); Mikayla M. Rogers, Portland, ME (US); Timothy J. Harding, Wethersfield, CT (US); Marshall F. Thayer, Waterboro, ME (US); Joseph Micucci, Scarborough, ME (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/477,912

(22) Filed: Sep. 29, 2023

(65) Prior Publication Data

US 2024/0110487 A1 Apr. 4, 2024

Related U.S. Application Data

(60) Provisional application No. 63/411,903, filed on Sep. 30, 2022.

(51) Int. Cl.

| | |
|---|---|
| ***F01D 11/08*** | (2006.01) |
| ***F01D 9/04*** | (2006.01) |
| ***F01D 25/24*** | (2006.01) |

(52) U.S. Cl.

CPC ................ *F01D 11/08* (2013.01); *F01D 9/04* (2013.01); *F01D 25/246* (2013.01); *F05D 2300/6033* (2013.01)

(58) Field of Classification Search

CPC ........... F01D 11/08; F01D 9/04; F01D 25/246

See application file for complete search history.

(56) References Cited

U.S. PATENT DOCUMENTS 5,639,210 A * 6/1997 Carpenter ............ E05B 35/001 415/173.3
5,639,211 A * 6/1997 Bintz ...................... F01D 11/02 415/173.7

(Continued)

FOREIGN PATENT DOCUMENTS

| | | | |
|---|---|---|---|
| CA | 2798307 A1 * | 6/2013 | .............. F01D 11/08 |
| EP | 1134360 | 9/2001 | |
| EP | 2980359 | 2/2016 | |

OTHER PUBLICATIONS

European Search Report for European Patent Application No. 23201309.4 mailed Feb. 16, 2024.

*Primary Examiner* — Brian Christopher Delrue

(74) *Attorney, Agent, or Firm* — Carlson, Gaskey & Olds, P.C.

(57) ABSTRACT

A gas turbine engine includes a turbine section that has a retainer ring, a first vane that bears against the retainer ring to prevent movement of the first vane in a first axial direction, a second vane axially spaced from the first vane, and a blade axially between the first vane and the second vane. A blade outer air seal is situated radially outwardly of the blade. The blade outer air seal includes a ceramic matrix composite body that defines a core gaspath side that faces the blade, a forward end, an aft end, and circumferential sides. There is a spring seal at the aft end of the blade outer air seal that seals against the second vane. The spring seal provides a preload that biases the blade outer air seal against the first vane and thereby biases the first vane against the retainer ring.

12 Claims, 1 Drawing Sheet

(56) References Cited

U.S. PATENT DOCUMENTS

| | | | | |
|---|---|---|---|---|
| 6,464,457 | B1 * | 10/2002 | Morgan | F16J 15/0887 277/630 |
| 8,079,807 | B2 | 12/2011 | Shapiro et al. | |
| 8,651,497 | B2 * | 2/2014 | Tholen | F16J 15/0887 277/644 |
| 8,920,112 | B2 * | 12/2014 | Ring | F01D 25/246 415/209.3 |
| 9,752,592 | B2 | 9/2017 | Sippel et al. | |
| 9,970,311 | B2 * | 5/2018 | Stevens | F01D 25/285 |
| 10,487,678 | B2 * | 11/2019 | Tyler, Jr. | F01D 11/08 |
| 11,286,812 | B1 * | 3/2022 | Freeman | F01D 25/246 |
| 2006/0005529 | A1 * | 1/2006 | Penda | F01D 11/16 60/782 |
| 2006/0045746 | A1 * | 3/2006 | Synnott | F01D 25/246 416/219 R |
| 2010/0092281 | A1 * | 4/2010 | Habarou | F01D 11/08 415/200 |
| 2010/0111678 | A1 * | 5/2010 | Habarou | F01D 9/04 415/173.3 |
| 2014/0255167 | A1 * | 9/2014 | Stevens | F01D 25/285 156/60 |
| 2016/0312640 | A1 * | 10/2016 | Clouse | F01D 5/225 |
| 2018/0016943 | A1 * | 1/2018 | Lefebvre | F01D 25/246 |
| 2019/0017401 | A1 | 1/2019 | Stoyanov | |
| 2019/0024801 | A1 * | 1/2019 | Davis | F16J 15/3212 |
| 2019/0186634 | A1 * | 6/2019 | Knapp | F01D 11/005 |
| 2019/0218928 | A1 | 7/2019 | Ciamarra et al. | |
| 2021/0189897 | A1 * | 6/2021 | Sippel | F01D 11/08 |

* cited by examiner

BLADE OUTER AIR SEAL WITH RETAINER RING

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A gas turbine engine according to an example of the present disclosure includes a turbine section that has a static structure that includes a retainer ring, and a first vane disposed about an engine axis and bearing against the retainer ring. The retainer ring prevents movement of the first vane in a first axial direction. A second vane is axially spaced from the first vane, and there is a blade axially between the first vane and the second vane. A blade outer air seal is situated radially outwardly of the blade. The blade outer air seal includes a ceramic matrix composite body that defines a core gaspath side facing the blade, a forward end, an aft end, and circumferential sides. A spring seal at the aft end of the blade outer air seal seals against the second vane and provides a preload biasing the blade outer air seal against the first vane, thereby also biasing the first vane against the retainer ring.

In a further embodiment of any of the foregoing embodiments, the first axial direction is a forward axial direction.

In a further embodiment of any of the foregoing embodiments, the first vane includes a platform, and the blade outer air seal abuts the platform.

In a further embodiment of any of the foregoing embodiments, the platform abuts the retainer ring.

In a further embodiment of any of the foregoing embodiments, the static structure defines a channel, and the retainer ring is disposed partially in the channel.

In a further embodiment of any of the foregoing embodiments, the ceramic matrix composite body defines a non-core gaspath side and includes a pair of flanges that projects from the non-core gaspath side, and the pair of flanges includes first and second pin holes that are aligned to receive a pin.

A gas turbine engine according to an example of the present disclosure includes a turbine section that includes a static structure that has a retainer ring and a first vane disposed about an engine axis and bearing against the retainer ring. The retainer ring prevents movement of the first vane in a first axial direction. A second vane is axially spaced from the first vane, and there is a blade axially between the first vane and the second vane. A blade outer air seal is situated radially outwardly of the blade and bears against the first vane. The blade outer air seal includes a ceramic matrix composite body that defines a core gaspath side facing the blade, a forward end, an aft end, and circumferential sides. The blade outer air seal and the first vane experience thermal strain during engine operation. A spring seal at the aft end of the blade outer air seal deflects to take up the thermal strain.

In a further embodiment of any of the foregoing embodiments, the first axial direction is a forward axial direction.

In a further embodiment of any of the foregoing embodiments, the first vane includes a platform, and the blade outer air seals abuts the platform.

In a further embodiment of any of the foregoing embodiments, the platform abuts the retainer ring.

In a further embodiment of any of the foregoing embodiments, the static structure defines a channel, and the retainer ring is disposed partially in the channel.

In a further embodiment of any of the foregoing embodiments, the ceramic matrix composite body defines a non-core gaspath side and includes a pair of flanges that projects from the non-core gaspath side, and the pair of flanges includes first and second pin holes that are aligned to receive a pin.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
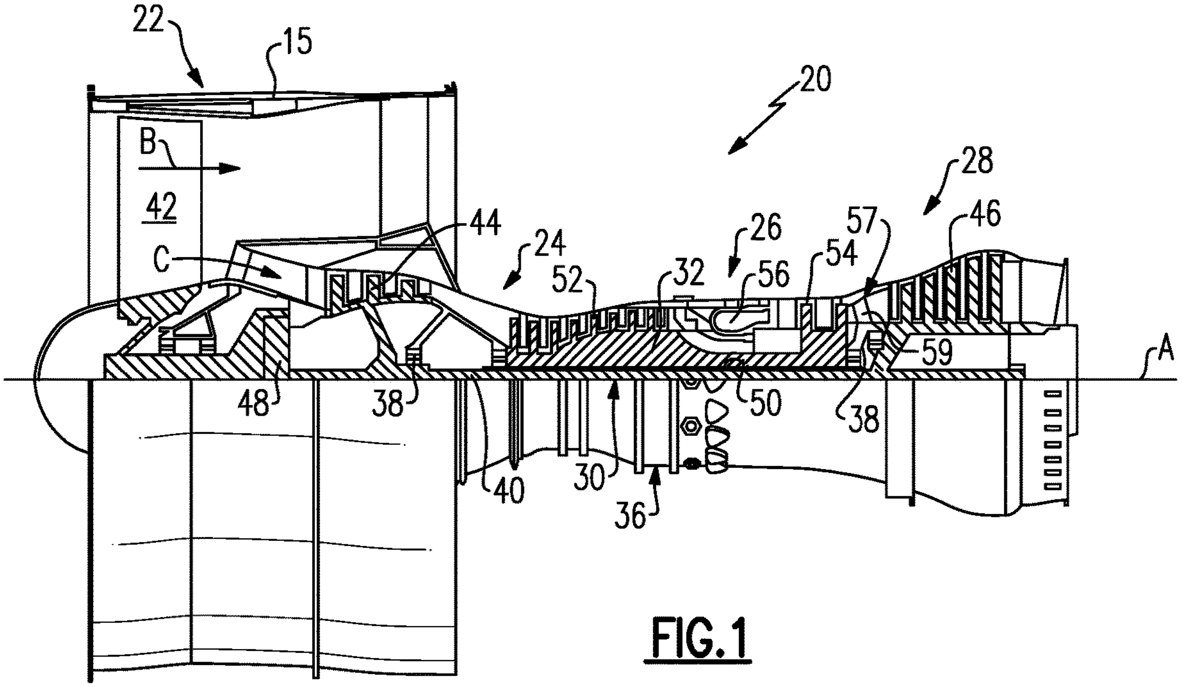
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram } °R)/(518.7°R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
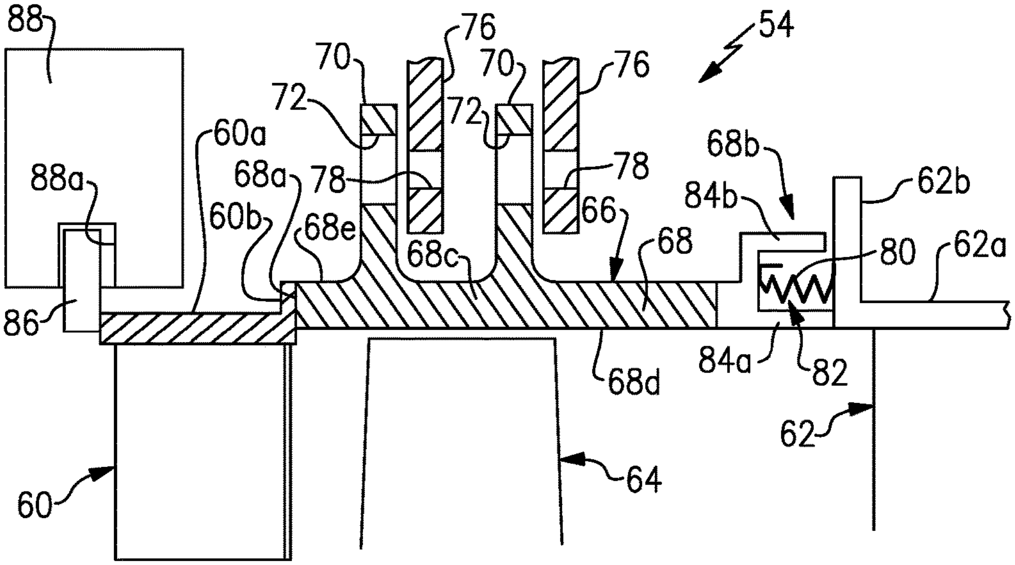
FIG. 2 illustrates a turbine section from the engine.

FIG. 2 illustrates a portion of the high pressure turbine 54 but is also applicable to the low pressure turbine 46. This section of the turbine 54 includes a first row of vanes 60 and a second row of vanes 62 axially spaced from the first row of vanes 60. There is a row of rotatable blades 64 axially between the first row of vanes 60 and the second row of vanes 62. A row of blade outer air seals 66 ("BOAS 66") is located axially between the first row of vanes 60 and the second row of vanes 62.

Each BOAS 66 is situated radially outwardly of the row of blades 64 and is comprised of a ceramic matrix composite body 68 ("CMC body 68"). A CMC material is comprised of one or more ceramic fiber plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure.

The CMC body 68 defines a forward end 68*a*, an aft end 68*b*, circumferential sides 68*c*, a core gaspath side 68*d* facing the row of blades 64, and a non-core gaspath side 68*e* opposite the core gaspath side 68*d*. There is a pair of flanges 70 that project radially from the non-core gaspath side 68*e* for mounting the BOAS 68 in the engine 20. For example, the flanges 70 define pin holes 72 that are aligned to receive a support pin there through. In that regard, a mating support structure 74, such as an engine case or other hardware, includes complementary flanges 76 and pin holes 78. A support pin is received through the pin holes 72/78 to secure the BOAS 66 to the support structure 74. The pinned joint substantially radially supports the BOAS 66 but the joint is non-rigid and permits some movement of the BOAS 66 so as to avoid over-constraint.

The forward end 68*a* of the CMC body 68 bears against at least one of the vanes 60 of the first row of vanes 60. For instance, each of the vanes 60 includes a platform 60*a* with a radially-projecting flange 60*b* that the CMC body 68 contacts. The joint formed by the contact between the flange 60*b* and the CMC body 68 is rigid in that the vane 60 and the BOAS 66 essentially act as a unitary body with respect to axial movement.

CMC material in general has lower thermal conductivity than superalloys and does not possess the same strength and ductility characteristics as superalloys, making CMCs more susceptible to distress from aerodynamic and/or other loads and thermally induced stresses caused by thermal gradients. Due to tolerances and thermal growth in gas turbine engines, it is difficult to maintain axial spacing at interfaces between a BOAS and the adjacent forward and aft vanes, thus making it difficult to maintain sealing at those interfaces. Moreover, mechanically constraining components to reduce variations at the interfaces is undesirable for CMCs. In these regard, as explained below, the BOAS 66 includes a spring seal 80 to preload the BOAS 66 and vane 60.

The aft end 68*b* of the CMC body 68 includes a seal channel 82 that is defined between radially inner and outer walls 86*a*/84*b* of the CMC body 68. The spring seal 80 is disposed in the seal channel 82 and seals against at least one of the vanes 62 of the second row of vanes 62. In the example shown, the spring seal 80 is, but is not limited to, a W-seal. In general, a W-seal has a cross-section that is shaped liked the letter "W." Other geometries of spring seals that provide pre-loading may alternatively be used as long as the set distance (of compression) is greater than the expected axial movement of the vane 60 and BOAS 66 so that the spring seal 80 can deflect to take up thermal strain and/or other axial movement.

Each of the vanes 62 includes a platform 62*a* with a radially-projecting flange 62*b* that the spring seal 80 bears against. The spring seal 80 is in a compressed state in order to provide a preload on the BOAS 66, which in turn loads against the vane 60. Forward of the row of vanes 60 there is a retainer ring 86 mounted on a static support structure 88, such as an engine case (which may be the same or different than the engine case or other hardware that includes the flanges 76). The retainer ring 86 may be a split ring, to facilitate assembly into the structure 88. For instance, the structure 88 defines a channel 88*a* and the retainer ring 86 is partially disposed in the channel 88*a*. The retainer ring 86 interlocks with the channel 88*a* and acts as a stop that the vanes 60 bear against. The retainer ring 86 thus prevents movement of the vanes 60 in a first axial direction, which here is an axially forward direction in the engine 20. Any axial movement of the vane 60 and the BOAS 66 is thereby limited to movement in the opposite, aft axial direction.

For instance, during operation of the engine 20 the vane 60 and the CMC body 68 experience thermal strain, either from thermal expansion or thermal contraction. As the vane 60 and BOAS 66 are constrained from moving axially forward, and the vane 60 and BOAS 66 act as a unitary body, the thermal strain manifests at the aft end 68*b* of the BOAS 66. The spring seal 80 deflects and thereby takes up (absorbs) the thermal strain. As an example, for thermal contraction of the vane 60 and BOAS 66, the spring seal 80, which is under preload, decompresses. For thermal expansion of the vane 60 and BOAS 66, the spring seal 80 compresses. The spring seal 80, however, always maintains a preload. The preload biases the BOAS 66 against the vane 60 and thereby biases the vane 60 against the retainer ring 86. Moreover, the preload keeps the forward end 68*a* of the BOAS 66 in constant contact with the platform 60*a* of the vane 60 and thereby provides a contact seal at the interface there between. The example arrangement therefore facilitates reducing the number of seals, as a separate seal may not be needed at the interface between the BOAS 66 and the vane 60. The arrangement also permits the vane 60 and BOAS 66 to move axially without over-constraint that might otherwise cause distress in the CMC material.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:

a turbine section including, a static structure including a retainer ring;

a first vane disposed about an engine axis, the first vane having a first vane platform bearing against the retainer ring, the retainer ring preventing movement of the first vane in a first axial direction, a second vane axially spaced from the first vane, the second vane having a second vane platform, and a blade axially between the first vane and the second vane;

a row of blade outer air seals situated radially outwardly of the blade, each of the blade outer air seals including a ceramic matrix composite body defining a core gaspath side facing the blade, a forward end, an aft end, and circumferential sides; and a spring seal at the aft end of at least one of the blade outer air seals and sealing against the second vane platform of the second vane, the spring seal providing a preload biasing the at least one of the blade outer air seals against the first vane platform and thereby biasing the first vane against the retainer ring.

2. The gas turbine engine as recited in claim 1, wherein the first axial direction is a forward axial direction.

3. The gas turbine engine as recited in claim 1, wherein the static structure defines a channel, and the retainer ring is disposed partially in the channel.

4. The gas turbine engine as recited in claim 1, wherein the ceramic matric composite body defines a non-core gaspath side and includes a pair of flanges that projects from the non-core gaspath side, and the pair of flanges includes first and second pin holes that are aligned to receive a pin.

5. A gas turbine engine comprising:

a turbine section including, a static structure including a retainer ring;

a first vane disposed about an engine axis and having a first vane platform bearing against the retainer ring, the retainer ring preventing movement of the first vane in a first axial direction, a second vane axially spaced from the first vane and having a second vane platform, and a blade axially between the first vane and the second vane;

a row of blade outer air seals situated radially outwardly of the blade and at least one of the blade outer air seals bearing against the first vane platform, each of the the blade outer air seals including a ceramic matrix composite body defining a core gaspath side facing the blade, a forward end, an aft end, and circumferential sides, the at least one blade outer air seals and the first vane experiencing thermal strain during engine operation; and a spring seal at the aft end of the at least one of the blade outer air seals, the spring seal deflecting to take up the thermal strain.

6. The gas turbine engine as recited in claim 5, wherein the first axial direction is a forward axial direction.

7. The gas turbine engine as recited in claim 5, wherein the first vane platform abuts the retainer ring.

8. The gas turbine engine as recited in claim 5, wherein the static structure defines a channel, and the retainer ring is disposed partially in the channel.

9. The gas turbine engine as recited in claim 5, wherein the ceramic matrix composite body defines a non-core gaspath side and includes a pair of flanges that projects from the non-core gaspath side, and the pair of flanges includes first and second pin holes that are aligned to receive a pin.

10. The gas turbine engine as recited in claim 1, wherein the first vane platform includes a radially-projecting flange, and the at least one of the blade outer air seals contacts an axially-aft face of the radially-projecting flange.

11. The gas turbine engine as recited in claim 10, wherein the retainer ring is a split ring.

12. The gas turbine engine as recited in claim 10, wherein the ceramic matric composite body defines a non-core gaspath side and includes a pair of flanges that projects radially from the non-core gaspath side, and the pair of flanges includes first and second pin through-holes that are aligned to receive a pin.

* * * * *